US009432918B2

(12) United States Patent
Su et al.

(10) Patent No.: US 9,432,918 B2
(45) Date of Patent: Aug. 30, 2016

(54) APPARATUS AND METHODS OF RECEIVE DIVERSITY (RXD) FULL CELL SEARCH

(71) Applicant: QUALCOMM Incorporated, San Diego, CA (US)

(72) Inventors: Yi Su, San Jose, CA (US); Sharif Ahsanul Matin, San Diego, CA (US); Ahmad Bilal Hasan, San Diego, CA (US); Ramesh Chandra Chirala, San Diego, CA (US); Atin Kumar, San Diego, CA (US); An-Swol Clement Hu, Belmont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 13/950,696

(22) Filed: Jul. 25, 2013

(65) Prior Publication Data

US 2014/0133472 A1 May 15, 2014

Related U.S. Application Data

(60) Provisional application No. 61/725,610, filed on Nov. 13, 2012.

(51) Int. Cl.
| | |
|---|---|
| *H04B 7/02* | (2006.01) |
| *H04W 48/16* | (2009.01) |
| *H04B 1/7083* | (2011.01) |
| *H04B 7/04* | (2006.01) |

(Continued)

(52) U.S. Cl.
CPC ........... *H04W 48/16* (2013.01); *H04B 1/7083* (2013.01); *H04B 7/0417* (2013.01); *H04B 7/0837* (2013.01); *H04W 56/00* (2013.01)

(58) Field of Classification Search
None
See application file for complete search history.

(56) References Cited

U.S. PATENT DOCUMENTS

| 6,744,747 B2 * | 6/2004 | Shiu et al. .................. 370/331 |
| 6,768,768 B2 | 7/2004 | Rao et al. |
| 6,894,996 B2 | 5/2005 | Lee |

(Continued)

OTHER PUBLICATIONS

3rd Generation Partnership Project; Technical Specification Group Radio Access Network; Physical layer procedures (FDD) (Release 11), 3GPP Standard; 3GPP TS 25.214, 3rd Generation Partnership Project (3GPP), Mobile Competence Centre ; 650, Route Des Lucioles ; F-06921 Sophia-Antipolis Cedex ; France, vol. RAN WG1, No. V11.3.0, Sep. 18, 2012, pp. 1-112, XP050649176.

(Continued)

*Primary Examiner* — Gregory Sefcheck
*Assistant Examiner* — Jenkey Van
(74) *Attorney, Agent, or Firm* — Darren M. Simon

(57) ABSTRACT

Apparatus and methods of receive diversity (RxD) full cell search by a user equipment (UE) in a wireless communication system are described. In an aspect, a first set of received energies of a first signal received at a first antenna and a second set of received energies of a second signal received at a second antenna may be separately determined. Based thereon, a set of peak energies and corresponding antenna indices, along with a slot timing of at least one cell corresponding to the set of peak energies and corresponding antenna indices, may be determined. A frame timing and a scrambling code for the at least one cell then may be determined using a respective one of the first antenna and the second antenna corresponding to each of the set of peak energies and the corresponding antenna indices, along with the respective slot timing of the at least one cell.

18 Claims, 10 Drawing Sheets

(51) Int. Cl.
  *H04B 7/08* (2006.01)
  *H04W 56/00* (2009.01)

(56) References Cited

U.S. PATENT DOCUMENTS

| | | | | |
|---|---|---|---|---|
| 6,980,587 B2* | 12/2005 | Gesret | ............... | H04B 1/7083 342/357.48 |
| 7,532,590 B2 | 5/2009 | Ok et al. | | |
| 2003/0227946 A1* | 12/2003 | Schwarz et al. | ............. | 370/503 |
| 2004/0266374 A1 | 12/2004 | Saed et al. | | |
| 2005/0272384 A1 | 12/2005 | Kogure | | |
| 2009/0046671 A1* | 2/2009 | Luo | ............................. | 370/336 |
| 2009/0163204 A1* | 6/2009 | Farnsworth | ........... | H04W 48/16 455/434 |
| 2010/0232397 A1 | 9/2010 | Hu et al. | | |
| 2010/0304744 A1 | 12/2010 | Hu et al. | | |
| 2013/0143554 A1* | 6/2013 | Hahm et al. | .................. | 455/434 |

OTHER PUBLICATIONS

International Search Report and Written Opinion—PCT/US2013/069818—ISA/EPO—Feb. 4, 2014.

* cited by examiner

APPARATUS AND METHODS OF RECEIVE DIVERSITY (RXD) FULL CELL SEARCH

CLAIM OF PRIORITY UNDER 35 U.S.C. §119

The present Application for patent claims priority to Provisional Application No. 61/725,610 entitled "APPARATUS AND METHODS OF RECEIVE DIVERSITY (RXD) FULL CELL SEARCH" filed Nov. 13, 2012, and assigned to the assignee hereof.

BACKGROUND

1. Field

Aspects of the present disclosure relate generally to wireless communication systems, and more particularly, to apparatus and methods of receive diversity (RXD) full cell search.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks.

A wireless communication network may include a number of cells that can support communication for a number of user equipments (UEs). A UE may be within the coverage of one or more cells at any given moment. The UE may perform a search to detect cells and to acquire timing and other information for the detected cells.

During a cell search, a UE searches for a cell and determines slot synchronization, frame synchronization and code group identification, and a scrambling code of the cell. The cell search is typically carried out in three steps: Step 1: Slot synchronization, Step 2: Frame synchronization and code-group identification, and Step 3: Scrambling-code identification.

Step 1: Slot Synchronization

During the first step of the cell search procedure, a UE uses the Synchronization Channel (SCH) primary synchronization code to acquire slot synchronization for a cell. The UE may use a single matched filter (or any similar device) matched to the primary synchronization code, which is common to all cells. The slot timing of the cell may be obtained by the UE by detecting peaks in the matched filter output.

Step 2: Frame Synchronization and Code-Group Identification

During the second step of the cell search procedure, the UE uses the SCH secondary synchronization code to identify frame synchronization and a code group of the cell found in the first step. The UE may correlate the received signal with all possible secondary synchronization code sequences and then, based thereon, identify the maximum correlation value. Since the cyclic shifts of the secondary synchronization code sequences are unique, the specific code group of the cell, as well as the frame synchronization, may be determined by the UE.

Step 3: Scrambling-Code Identification

During the third and last step of the cell search procedure, the UE determines the exact primary scrambling code used by the cell identified in step 1. The primary scrambling code may be identified by the UE through chip-by-chip (or, alternatively, symbol-by-symbol) correlation over the Common Pilot Channel (CPICH) based on the codes within the code group identified in the second step. After the primary scrambling code has been identified, and based thereon, the UE may detect the Primary Common Control Physical Cannel (CCPCH). The UE then may read the system- and cell-specific Broadcast Channel (BCH) information from the Primary CCPCH.

If the UE has received information about which scrambling codes to search for, steps 2 and 3 above can be simplified. For example, a 2-step full search procedure may be used to provide an increase in efficiency over the above-noted 3-step full search.

The 2-step full search procedure may include Step A and Step B. In Step A, the UE performs a Step 1 (or step A) search to acquire the slot timing of neighboring cells. In Step B, for each multipath detected in Step A, the UE may determine the corresponding scrambling code and frame timing. A UE may determine a number of scrambling code hypotheses, which is equal to a number of neighbors N. Since a frame (which includes 38400 chips) consists of 15 slots (which includes 2560 chips), the UE may determine 15 hypotheses for frame timing. As such, the UE may correlate the received signal with 15N hypotheses for each multipath.

Thus, the aforementioned full search algorithms include two stages. The first stage (e.g., step 1 in the 3-step algorithm and step A in the 2-step algorithm) is to acquire slot timing and the second stage (e.g., steps 2 and 3 (or 2/3) in the 3-step algorithm and step B in the 2-step algorithm) aims to determine frame timing and scrambling code.

In a conventional system having receive diversity (RxD), e.g., a UE with a multiple antenna receiver, a full search algorithm may be described as follows. In each step of a full search, a searcher component (which may be, for example, part of a UE) combines the ratio of pilot signal power (Ec) to total power (Io) received, or Ec/Io (which may also be referred to herein as "EcIo") from two receive (Rx) antennas and detects cells when the sum Ec/Io exceeds a certain threshold. However, such an RxD full search implementation has several drawbacks.

First, the detection probability performance of the conventional RxD full search algorithm may degrade with an imbalance of Ec/Io. In field conditions, it is common to have receive (Rx) imbalance. For example, when a primary receive antenna (Rx0) is operating just above an automatic gain control (AGC) sensitivity level, the Primary Synchronization Channel (P-SCH) and CPICH Ec/Io from Rx0 may be much worse than P-SCH and CPICH Ec/Io from a secondary antenna (Rx1). In such scenarios, the conventional RxD full search may not be able to report peaks that could have been found in a non-RxD search. In addition, the conventional RxD full search algorithm only uses information related to the summed Ec/Io. Therefore, the conventional RxD full search algorithm may not detect an Ec/Io imbalance and, consequently, may not be able to determine the better antenna as between Rx0 and Rx1.

Second, the conventional RxD full search algorithm does not provide a scalable implementation, which may allow a UE to efficiently trade off detection probability and computational complexity. For example, step B in the 2-step full search can be very costly if the number of cells to search is large, especially for a UE that supports detected set cell search.

As such, improvements in receive diversity (RXD) full cell search are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of performing a full cell search by a user equipment in a wireless communication system is described. The method may include determining a first set of received energies of a first signal received at a first antenna. The method may include determining a second set of received energies of a second signal received at a second antenna. Determining the second set may occur separately from the determining of the first set. The method may include determining a set of peak energies and corresponding antenna indices based on the first set of received energies and the second set of received energies. The method may include determining a slot timing of at least one cell corresponding to the set of peak energies and corresponding antenna indices. The method may include using a respective one of the first antenna and the second antenna corresponding to each of the set of peak energies and the corresponding antenna indices, and the respective slot timing of the at least one cell, to determine a frame timing and a scrambling code for the at least one cell.

In an aspect, a computer program product for performing a full cell search by a user equipment in a wireless communication system is described. The computer program product includes a computer-readable medium. The computer-readable medium may include at least one instruction executable to cause a computer to determine a first set of received energies of a first signal received at a first antenna. The computer-readable medium may include at least one instruction executable to cause the computer to determine a second set of received energies of a second signal received at a second antenna. Determining the second set may occur separately from the determining of the first set. The computer-readable medium may include at least one instruction executable to cause the computer to determine a set of peak energies and corresponding antenna indices based on the first set of received energies and the second set of received energies. The computer-readable medium may include at least one instruction executable to cause the computer to determine a slot timing of at least one cell corresponding to the set of peak energies and corresponding antenna indices. The computer-readable medium may include at least one instruction executable to cause the computer to use a respective one of the first antenna and the second antenna corresponding to each of the set of peak energies and the corresponding antenna indices, and the respective slot timing of the at least one cell, to determine a frame timing and a scrambling code for the at least one cell.

In an aspect, an apparatus for performing a full cell search by a user equipment in a wireless communication system is described. The apparatus may include means for determining a first set of received energies of a first signal received at a first antenna. The apparatus may include means for determining a second set of received energies of a second signal received at a second antenna. Determining the second set may occur separately from the determining of the first set. The apparatus may include means for determining a set of peak energies and corresponding antenna indices based on the first set of received energies and the second set of received energies. The apparatus may include means for determining a slot timing of at least one cell corresponding to the set of peak energies and corresponding antenna indices. The apparatus may include means for using a respective one of the first antenna and the second antenna corresponding to each of the set of peak energies and the corresponding antenna indices, and the respective slot timing of the at least one cell, to determine a frame timing and a scrambling code for the at least one cell.

In an aspect, an apparatus for performing a full cell search by a user equipment in a wireless communication system is described. The apparatus may include at least one memory. The apparatus may include an energy determiner in communication with the memory and configured to determine a first set of received energies of a first signal received at a first antenna, and determine a second set of received energies of a second signal received at a second antenna. Determining the second set may occur separately from the determining of the first set. The apparatus may include a peak/index determiner configured to determine a set of peak energies and corresponding antenna indices based on the first set of received energies and the second set of received energies, and determine a slot timing of at least one cell corresponding to the set of peak energies and corresponding antenna indices. The apparatus may include a specific peak/antenna determiner configured to use a respective one of the first antenna and the second antenna corresponding to each of the set of peak energies and the corresponding antenna indices, and the respective slot timing of the at least one cell, to determine a frame timing and a scrambling code for the at least one cell.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
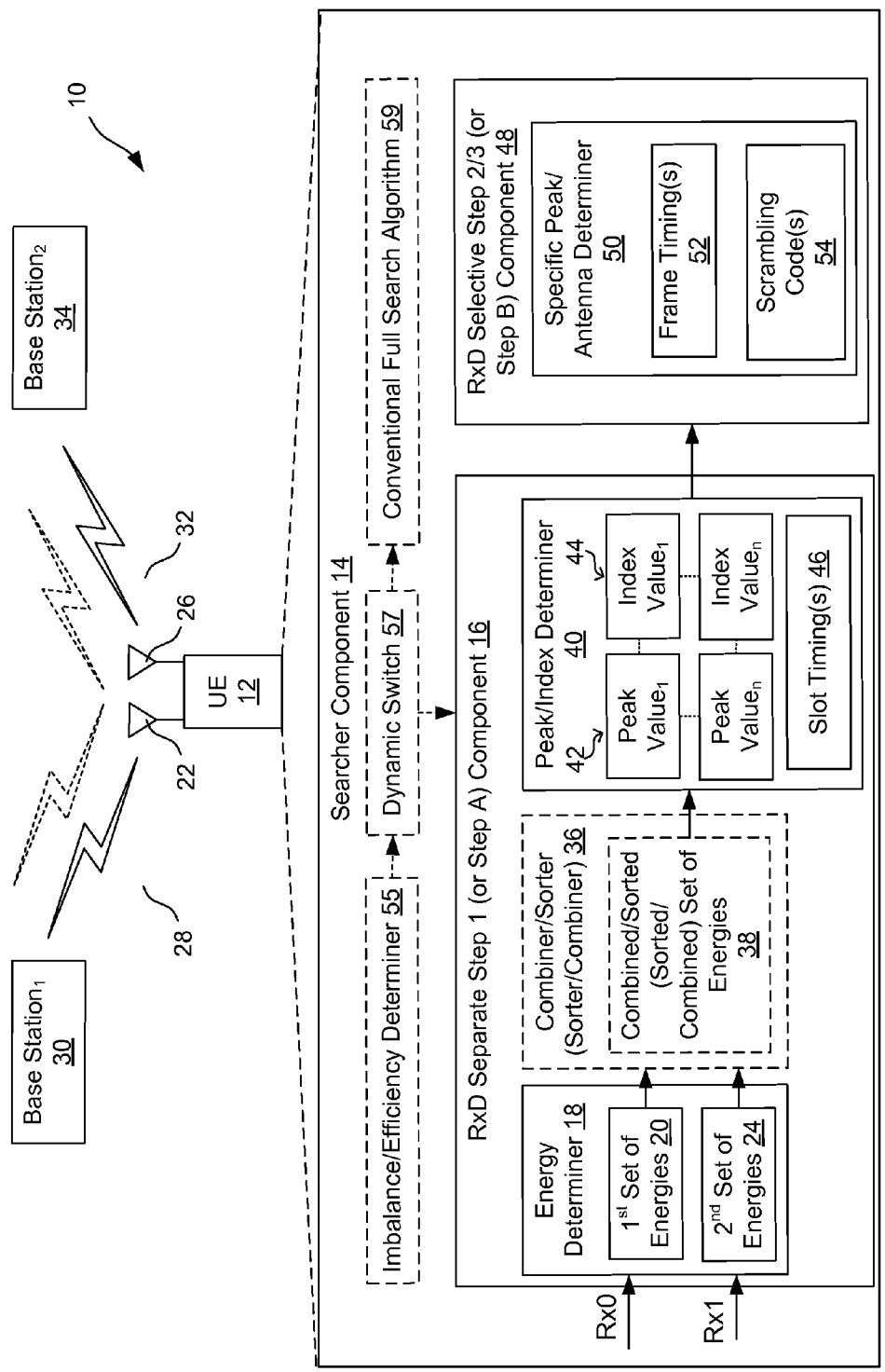
FIG. 1 is schematic diagram of a wireless communication system including a user equipment (UE) having a searcher component aspect as described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A new behavior to allow a user equipment (UE) to perform a receive diversity (RxD) full search for a cell, with limited computational complexity while still achieving satisfactory performance, is described. The new behavior may for example, allow the UE to achieve power savings and/or operate even in a situation where the UE has searcher component and/or processor computing constraints.

As described herein, the present apparatus and methods provide an RxD full search algorithm having enhancements that modify the conventional full search algorithms to include an RxD separate step 1 (or step A) search, e.g., separate for each antenna to determine slot timing, and an RxD selective step 2/3 (or step B) search, e.g., where the results from the separate step 1 (or step A) search are selectively used with the antenna determined to be better than the other antenna(s) to perform further searches and determine frame timing and scrambling code of a cell. As a result, for example, the separate step 1 (or step A) search of the present apparatus and methods may enable a searcher component of a UE to, in effect, detect imbalances of a ratio of pilot signal power (Ec) to total power (Io) received, or Ec/Io (which may also be referred to herein as "EcIo"), between the multiple antennas in an RxD configuration, and based on the detected imbalance, selectively perform a simplified step 2/3 search using the respective best antenna for each subsequent search.

Specifically, in one non-limiting example, the RxD separate step 1 (or step A) search of the present apparatus and methods may be performed by a searcher component of the UE configured to compute Primary Synchronization Channel (P-SCH) Ec/Io for at least two receive (Rx) antennas separately. Further, the searcher component may be configured to combine the computed Ec/Io values and perform a peak sort to identify a given (or dynamic) number of peaks. Alternatively, the searcher component may separately perform the peak sort first and then combine non-duplicate peak energies from the two Rx antennas. In any case, the RxD separate step 1 (or step A) search may be used to also determine antenna indices associated with the peaks, which may be used for the following RxD selective step 2/3 (or step B) search. Specifically, in a non-limiting aspect, the present apparatus and methods provide for an RxD selective step 2/3 (or step B) search where the searcher component of a UE may use the result of the step 1 (or step A) search to perform the step 2/3 (or step B) search for a specific receive antenna.

Referring to FIG. 1, in an aspect, a wireless communication system 10 includes a user equipment (UE) 12 having a searcher component 14 configured to perform an enhanced receive diversity (RxD) full cell search that has, for example, limited computational complexity while maintaining satisfactory performance.

Searcher component 14 includes an RxD separate step 1 (or step A) component 16 having an energy determiner 18 configured to calculate a first set of received energies 20 of a first signal received at a first antenna 22, and to separately determine a second set of received energies 24 of a second signal received at a second antenna 26. For example, the first and second signal received at first antenna 22 and second antenna 26, respectively, may be multipath versions of a same signal, e.g., signal 28 from a first base station (e.g., base station₁) 30 and/or signal 32 from a second base station (e.g., base station₂) 34. Further, for example, the received signal 28 and/or signal 32, may include, at least, Primary Synchronization Channel (P-SCH) information and Common Pilot Channel (CPICH) information. Further, for example, the first set of receive energies 20 and second set of receive energies 24 may be respective values of a ratio of pilot signal power (Ec) to total power (Io) received, or Ec/Io (which may also be referred to herein as "EcIo").

Optionally, RxD separate step 1 (or step A) component 16 may include a sorter/combiner (or combiner/sorter) component 36 configured to either separately sort and then combine, or combine and then sort, the first set of receive energies 20 and the second set of receive energies 24 to define a set of sorted/combined (or combined/sorted) energies 38.

Further, RxD separate step 1 (or step A) component 16 also may include a peak/index determiner 40 configured to determine a set of peak energies 42 and antenna indices 44, which correspond to the set of peak energies 42, based on the first set of received energies 20 and the second set of received energies 24. RxD separate step 1 (or step A) component 16 then may be configured to determine a slot timing 46 of at least one cell corresponding to the set of peak energies 42 and corresponding antenna indices 44.

Additionally, searcher component 14 may include an RxD selective step 2/3 (or step B) component 48 configured to receive the results of the processing performed by the RxD separate step 1 (or step A) component 16, use the results to determine which of first antenna 22 and second antenna 26 is the better antenna, and, further making use of the results of step 1 (or step A), perform an efficient search based on the better antenna. More particularly, and for example, RxD selective step 2/3 (or step B) component 48 includes a specific peak/antenna determiner 50 that is configured to identify a respective one of the first antenna 22 and the second antenna 26 that corresponds to each of the set of peak energies 42 and the corresponding antenna indices 44. In other words, based on the results of the processing by RxD separate step 1 (or step A) component 16, duplicate peaks may be eliminated and RxD selective step 2/3 (or step B) component 48 may determine a given number of the best peaks on which to continue processing. Further, for example, RxD selective step 2/3 (or step B) component 48 may determine the antenna index having the better Ec/Io, and RxD selective step 2/3 (or step B) component 48 may use those peaks to continue the search on the respective antenna, thereby improving computational and battery-related efficiency.

Specifically, RxD selective step 2/3 (or step B) component 48 may use the identified peak, index, and antenna to perform a search using the respective slot timing 46 of the at least one cell, and to determine a frame timing 52 and a scrambling code 54 for the at least one cell.

Optionally, in an aspect, searcher component 14 may include an imbalance/efficiency determiner 55 configured to determine whether to execute processing by RxD separate step 1 (or step A) component 16 and RxD selective step 2/3 (or step B) component 48, based on a detected imbalance between antennas 22 and 26, a computational and/or battery condition or desired efficiency, or some combination thereof. For example, imbalance/efficiency determiner 55 may determine an imbalance between first antenna 22 and second antenna 26 that exceeds an imbalance threshold, thereby triggering, for example, a dynamic switch 57 to cause execution of processing performed by RxD separate step 1 (or step A) component 16 and RxD selective step 2/3 (or step B) component 48. In another example, imbalance/efficiency determiner 55 may determine that execution of processing by RxD separate step 1 (or step A) component 16 and RxD selective step 2/3 (or step B) component 48 would result in a threshold savings of computational and/or battery power value that meets a threshold savings, or that an available computational and/or battery power value is below a threshold availability, thereby causing execution of the separate and selective aspects of the present apparatus and methods. Alternatively, imbalance/efficiency determiner 55 may determine that the above-noted example thresholds do not trigger execution of the separate and selective aspects of the present apparatus and methods, and thus imbalance/efficiency determiner 55 may cause dynamic switch 57 to trigger execution of a conventional full search algorithm 59, such as the Step 1, 2, and 3 algorithm or the Step A and B algorithm as described above.

Thus, according to the present apparatus and methods, UE 12 including multiple antennas, e.g., having receive diversity (RxD), and configured to execute processing by RxD separate step 1 (or step A) component 16 and RxD selective step 2/3 (or step B) component 48, may perform an efficient full cell search using a best antenna to obtain satisfactory full search results, thereby identifying one or more cells as candidates for reselection or handover.

Figure 2:
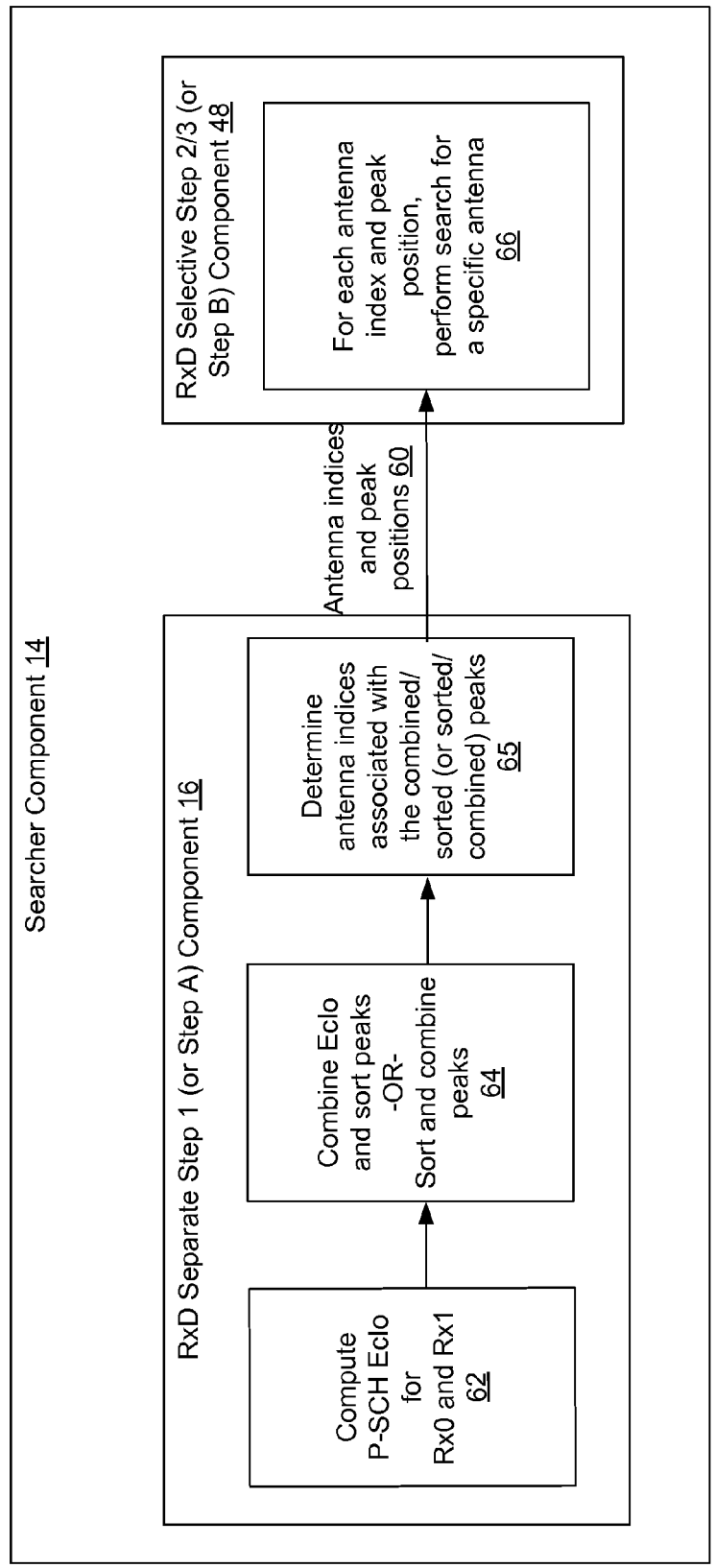
FIG. 2 is a schematic diagram of an aspect of the searcher component of FIG. 1, including an RxD separate step 1 (or step A) determiner component and an RxD selective step 2/3 (or step B) determiner component.

Referring to FIG. 2, in one non-limiting example use case, the RxD separate step 1 (or step A) component 16 of the present apparatus and methods may be configured, at 62, to separately compute P-SCH Ec/Io values for at least two receive (Rx) antennas Rx0 and Rx1. Further, the RxD separate step 1 (or step A) component 16 may be configured, at 64, to combine the Ec/Io values and perform a peak sort to identify a given (or dynamically determined) number of peaks. Alternatively, and also at 64, the RxD separate step 1 (or step A) component 16 may be configured to separately perform a peak sort first and then combine non-duplicate peak energies from the two Rx antennas. In any case, the RxD separate step 1 (or step A) component 16 also may be configured, at 65, to determine antenna indices associated with the peaks, both of which may be used in the following RxD selective step 2/3 (or step B) search. Specifically, in a non-limiting aspect, the RxD selective step 2/3 (or step B) component 48 may be configured to use output information, e.g., antenna indices and peak positions 60, from the RxD separate step 1 (or step A) component 16 to perform, at 66, the step 2/3 (or step B) search for the specific receive antenna that is determined to be better than the other receive antenna.

Figure 3:
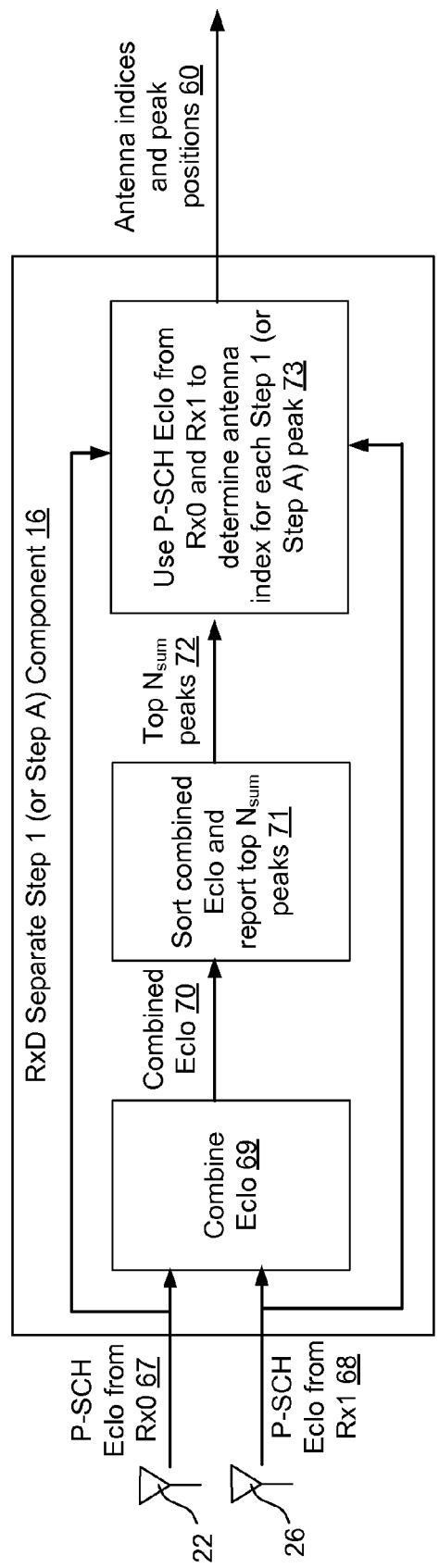
FIG. 3 is a schematic diagram of an aspect of the RxD separate step 1 (or step A) determiner component of FIG. 2.

Referring to FIG. 3, as noted above, the RxD step 1 (or step A) searcher component 14 may be configured to combine Ec/Io values and then sort the peak values, which may be referred to as Option #1. In a non-limiting example use case, RxD separate step 1 (or step A) component 16 may operate according to Option #1 as follows.

Option #1:

The searcher component 14, at RxD separate step 1 (or step A) component 16, may be configured to, at 69, calculate a combined P-SCH Ec/Io from two Rx antennas, e.g., P-SCH Ec/Io 67 from first antenna 22 and P-SCH Ec/Io 68 from second antenna 26, for all slot timing hypotheses. More particularly, $PSCH\_EcIo_{combined}[i]=f(PSCH\_EcIo_{rx0}[i], PSCH\_EcIo_{rx1}[i])$, for $i=0, 1, \ldots, N_{slot\_hyp}-1$, where function $f(x,y)$ maps two P-SCH Ec/Io values, x and y, to a single P-SCH Ec/Io value. As such, the function $f(x,y)$ may be used to describe a detection probability performance such that the outcome of function $f(x,y)$ may be utilized by imbalance/efficiency determiner 55 in order to judge whether or not to execute the conventional search algorithm 59 or the separate and selective aspects described herein.

Further, the function $f(x,y)$ may be a linear or non-linear function. For example, it can take the form of $f(x,y)=x+y$, $f(x,y)=\max(x,y)$, $f(x,y)=\text{sqrt}(x^2+y^2)$, etc., where $N_{slot\_hyp}$ denotes the total number of slot timing hypotheses.

At 71, the RxD separate step 1 (or step A) component 16 may be configured to receive combined Ec/Io 70 (e.g., the outcome of the above formula), and, based thereon, sort the combined Ec/Io (e.g., $PSCH\_EcIo_{combined}$) for all slot timing hypotheses and report the top $N_{sum}$ ordered step 1 peaks 72.

At 73, RxD separate step 1 (or step A) component 16 may be configured to receive the top $N_{sum}$ peaks 72 and, based thereon, along with the P-SCH Ec/Io 67 from first antenna 22 and the P-SCH Ec/Io 68 from second antenna 26, determine an antenna index for each step 1 (or step A) peak. In other words, the two P-SCH Ec/Io values reported from the two Rx antennas at the peak positions may be compared and, based on the comparison, the better one of first antenna 22 and second antenna 26 may be selected as the antenna index output. The processing at 73 may be described by the following.

Inputs:
(a) $N_{sum}$ ordered step 1 peaks (derived based on combined Ec/Io) with peak position Pos[i] and combined P-SCH Ec/Io $PSCH\_EcIo_{combined}$ [i] in which $i=0,1,\ldots,N_{sum}-1$,
(b) step 1 energies from Rx0 with peak position $Pos_0[i]$ and P-SCH Ec/Io $PSCH\_EcIo_{rx0}[i]$ in which $i=0,1,\ldots, N_{slot\_hyp}-1$, and
(c) step 1 energies from Rx1 with peak position $Pos_1[i]$ and P-SCH Ec/Io $PSCH\_EcIo_{rx1}[i]$ in which $i=0,1,\ldots, N_{slot\_hyp}-1$.

Output:
(a) $N_{sum}$ step 1 peaks that will be used by step 2/3 (or step B) search with -continued

```
peak positions Paired_Pos[m] and antenna indices Paired_ant_index[m] in
which m=0,1,2,..., N_sum -1.
For k=0: N_sum -1
    Paired_Pos[k] = Pos[k];
    If PSCH_EcIo_rx0 [Pos[k]]> PSCH_EcIo_rx1 [Pos[k]]
        Paired_ant_index[k] = 0;
    Else
        Paired_ant_index[k] = 1;
    End
End
```

Figure 4:
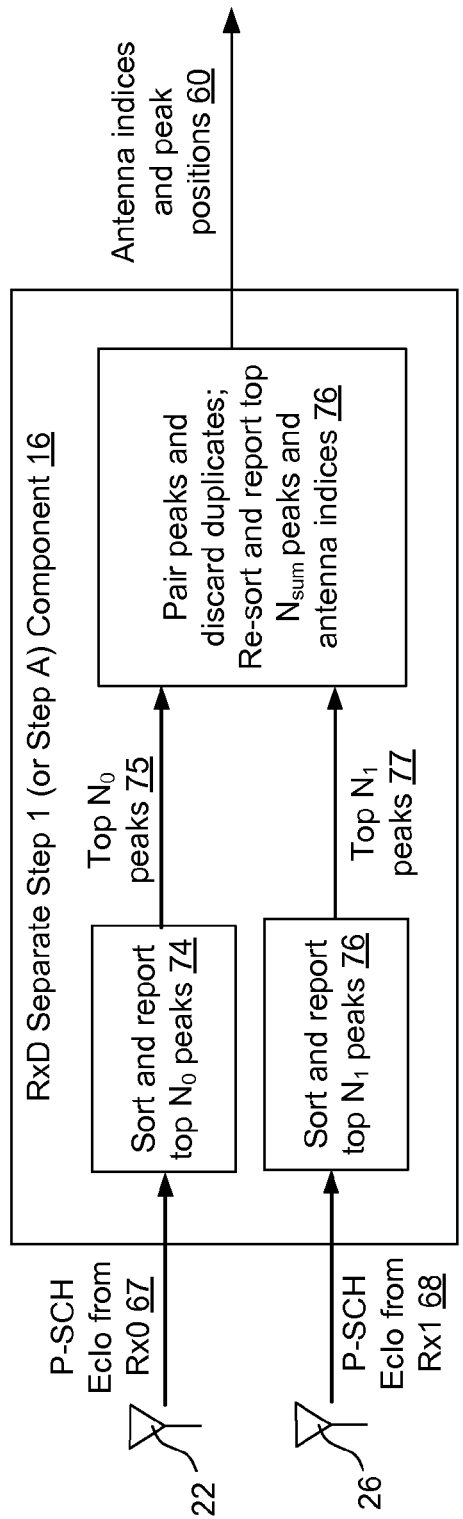
FIG. 4 is a schematic diagram of an aspect of the RxD separate step 1 (or step A) determiner component of FIG. 2.

Referring to FIG. 4, as noted above, the RxD separate step 1 (or step A) component 16 may be configured to separately sort Ec/Io values and then combine the peak values, which may be referred to as Option #2. In one non-limiting example use case, RxD separate step 1 (or step A) component 16 may operate according to Option #2 as follows.

Option #2

The searcher component 14, at RxD separate step 1 (or step A) component 16, may be configured to, at 74, sort and report top $N_0$ peaks 75 (e.g., PSCH_EcIo$_{rx0}$) based on P-SCH Ec/Io 67 from first antenna 22, and, at 76, sort and report top $N_1$ peaks 77 (e.g., PSCH_EcIo$_{rx1}$) based on P-SCH Ec/Io 68 from second antenna 26, for all slot timing hypotheses. More particularly, peak sorting and Ec/Io reporting may be performed separately on the two antennas. Therefore, the total number of returned peaks may be doubled. For example, assume the UE receives $N_0$ step 1 peaks from Rx0 (e.g., first antenna 22) and $N_1$ step 1 peaks from Rx1 (e.g., second antenna 26). For Rx0, the sorted step 1 peak positions and Ec/Io values may be referred to as Sorted_Pos$_0$[i] and Sorted_PSCH_EcIo$_{rx0}$[i] with i=0, 1, . . . , $N_0$−1. For Rx1, the step 1 peak positions and Ec/Io values may be referred to as Sorted_Pos$_1$[j] and Sorted_P-SCH_EcIo$_{rx1}$[j] with j=0, 1, . . . , $N_1$−1.

Since the total number of step 1 peaks that RxD selective step 2/3 (or step B) component 48 can use may be limited, the RxD separate step 1 (or step A) component 16 should avoid sending the same step 1 peak from the two Rx antennas (e.g., duplicate peaks) to RxD selective step 2/3 (or step B) component 48. Otherwise, RxD selective step 2/3 (or step B) component 48 may search on stronger step 1 peaks for the same cell twice (because, for example, the two step 1 peaks from the same cell may not be perfectly aligned), which reduces the probability of discovering other cells from weaker step 1 peaks and may reduce computational and other efficiencies.

At 76, RxD separate step 1 (or step A) component 16 may be configured to receive top $N_0$ peaks 75 and top $N_1$ peaks 77, pair peaks and discard duplicates, and re-sort and report top $N_{sum}$ peaks and antenna indices. As such, RxD separate step 1 (or step A) component 16 may output antenna indices and peak positions 60 to RxD selective step 2/3 (or step B) component 48. The processing at 76 may be described by the following.

```
    Input:
(a)    N_0 ordered step 1 peaks from Rx0 with peak position Sorted-
       _Pos_0[i]
       and P-SCH Ec/Io Sorted_P_SCH_EcIo_rx0 [i] in which i=0,1,...,N_0−1, and
(b)    N_1 ordered step 1 peaks from Rx1 with peak position Sorted-
       _Pos_1[j]
       and P-SCH Ec/Io Sorted_PSCH_EcIo_rx1 [j] in which j= 0, 1,..., N_1−1
    Output:
(a)    N_sum step 1 peaks that will be used by step 2/3 (or step B) search
       with
peak positions Paired_Pos[m] and antenna indices Paired_ant_index[m] in
```

-continued

```
which m=0,1,2,..., N_sum −1.
For pairing peaks and discarding duplicates,
For k=0:N_0−1
    Paired_Pos[k] = Sorted_Pos_0[k];
    Paired_EcIo[k] = Sorted_PSCH_EcIo_rx0[k];
    Paired_ant_index[k] = 0;
End
For m=0: N_1−1
    Flag=0, n=0;
    While n<N_0
        if |Paired_Pos[n] − Sorted_Pos_1[m]|≤1cx2
            Flag=1;
            If Paired_EcIo[n] < Sorted_PSCH_EcIo_rx1[m]
                Paired_Pos[n] = Sorted_Pos_1[m];
                Paired_EcIo[n] = Sorted_PSCH_EcIo_rx1[m];
                Paired_ant_index[n] = 1;
            End
            Break
        Else
            n=n+1;
            Continue
        End
    End
    If Flag == 0
        k=k+1;
        Paired_Pos[k] = Sorted_Pos_1[m];
        Paired_EcIo[k] = Sorted_PSCH_EcIo_rx1[m];
        Paired_ant_index[k] = 1;
    End
End
For re-sorting, sort Paired_EcIo[0], Paired_EcIo[1], ... , Paired_EcIo[k],
such that the top N_sum peaks are output to step 2/3 (or step B) search and
their peak positions and antenna indices are specified in arrays
Paired_Pos and Paired_ant_index respectively.
```

Referring back to FIG. 1, and continuing with the above-described use case, the RxD selective step 2/3 (or step B) component 48 may perform a search accumulation on a selected receive antenna for each step 1 peak. In other words, the RxD selective step 2/3 (or step B) component 48 may use the better antenna corresponding to the respective peak value to perform its search. The step 1 result processing algorithm described above may determine the better receive antenna for each step 1 peak. With this information, RxD selective step 2/3 (or step B) component 48 may perform the step 2/3 (or step B) search on the antenna where the results of the step 1 (or step A) search shows a higher P-SCH Ec/Io. Therefore, the present apparatus and methods may allow the UE to trade off performance and computational complexity. Additionally, the UE can achieve better full search performance when it is not feasible to perform step 2/3 (or step B) search on both receive antennas.

Tables 1 and 2 provide non-limiting examples of the operation of the present apparatus and methods under Option #1 and Option #2, described above, to illustrate the principles of these aspects. In an actual implementation, the number of Primary Synchronization Signal (PSC) positions may be very large; however, the examples below only include 12 PSC positions for each antenna. The examples below also assume that f(x,y)=max(x,y) and $N_{sum}$=3. In the examples, an element is considered a peak if it has a higher search energy than its +1cx2 and −1cx2 neighbors. The shading in Tables 1 and 2 represent the Step 1 (or Step A) processing results from two different antennas (e.g., a primary antenna and a secondary antenna).

Option #1:

Table 1. The columns of Table 1 represent the following information: (a) P-SCH EcIo from Rx0, (b) P-SCH EcIo from Rx1, (c) Combined EcIo from Rx0 and Rx1, (d) Sort Combined EcIo, and (e) Determined antenna index for each peak.

| (a) | | | (b) | | | (c) | |
|---|---|---|---|---|---|---|---|
| PSC Pos. (cx2) | Search Energy (dB) | Antenna Index | PSC Pos. (cx2) | Search Energy (dB) | Antenna Index | PSC Pos. (cx2) | Search Energy (dB) |
| 0 | −16.20 | 0 | 0 | −17.20 | 1 | 0 | −16.20 |
| 1 | −17.57 | 0 | 1 | −16.57 | 1 | 1 | −16.57 |
| 2 | −14.00 | 0 | 2 | −12.00 | 1 | 2 | −12.00 |
| 3 | −18.06 | 0 | 3 | −15.06 | 1 | 3 | −15.06 |
| 4 | −14.88 | 0 | 4 | −11.88 | 1 | 4 | −11.88 |
| 5 | −15.64 | 0 | 5 | −10.64 | 1 | 5 | −15.64 |
| 6 | −5.48 | 0 | 6 | −6.48 | 1 | 6 | −5.48 |
| 7 | −16.08 | 0 | 7 | −17.08 | 1 | 7 | −16.08 |
| 8 | −15.41 | 0 | 8 | −17.41 | 1 | 8 | −15.41 |
| 9 | −17.22 | 0 | 9 | −16.22 | 1 | 9 | −16.22 |
| 10 | −16.58 | 0 | 10 | −17.58 | 1 | 10 | −16.58 |
| 11 | −18.26 | 0 | 11 | −15.26 | 1 | 11 | −15.26 |

| (d) | | | | (e) | | |
|---|---|---|---|---|---|---|
| # | PSC Pos. (cx2) | Search Energy (dB) | # | PSC Pos. (cx2) | Search Energy (dB) | Antenna Index |
| 0 | 6 | −5.48 | 0 | 6 | −5.48 | 0 |
| 1 | 4 | −11.88 | 1 | 4 | −11.88 | 1 |
| 2 | 2 | −12.00 | 2 | 2 | −12.00 | 1 |

Option #2:

Table 2. The columns of Table 2 represent the following information: (a) P-SCH EcIo from Rx0, (b) P-SCH EcIo from Rx1, (c) Sort EcIo for Rx0, (d) Sort EcIo for Rx1, and (e) Determined top $N_{sum}$ peaks.

As shown in the example of Table 2, the pairs determined by the pairing algorithm include (1) Ant0 6cx2 and Ant1 6cx2, (2) Ant0 2cx2 and Ant1 2cx2, (3) Ant0 8cx2 and Ant1 9cx2, and (4) Ant0 10cx2 and Ant1 11cx2. Note that the weaker peak in each pair is eliminated after pairing.

| (a) | | | (b) | | |
|---|---|---|---|---|---|
| PSC Pos. (cx2) | Search Energy (dB) | Antenna Index | PSC Pos. (cx2) | Search Energy (dB) | Antenna Index |
| 0 | −16.20 | 0 | 0 | −17.20 | 1 |
| 1 | −17.57 | 0 | 1 | −16.57 | 1 |
| 2 | −14.00 | 0 | 2 | −12.00 | 1 |
| 3 | −18.06 | 0 | 3 | −15.06 | 1 |
| 4 | −14.88 | 0 | 4 | −11.88 | 1 |
| 5 | −15.64 | 0 | 5 | −10.64 | 1 |
| 6 | −5.48 | 0 | 6 | −6.48 | 1 |
| 7 | −16.08 | 0 | 7 | −17.08 | 1 |
| 8 | −15.41 | 0 | 8 | −17.41 | 1 |
| 9 | −17.22 | 0 | 9 | −16.22 | 1 |
| 10 | −16.58 | 0 | 10 | −17.58 | 1 |
| 11 | −18.26 | 0 | 11 | −15.26 | 1 |

| (c) | | | | (d) | | |
|---|---|---|---|---|---|---|
| # | PSC Pos. (cx2) | Search Energy (dB) | Antenna Index | # | PSC Pos. (cx2) | Search Energy (dB) | Antenna Index |
| 0 | 6 | −5.48 | 0 | 0 | 6 | −6.48 | 1 |
| 1 | 2 | −14.00 | 0 | 1 | 11 | −15.26 | 1 |
| 2 | 4 | −14.88 | 0 | 2 | 2 | −12.00 | 1 |
| 3 | 8 | −15.41 | 0 | 3 | 9 | −16.22 | 1 |
| 4 | 0 | −16.20 | 0 | | | | |
| 5 | 10 | −16.58 | 0 | | | | |

| After pairing | | | After resorting | | |
|---|---|---|---|---|---|
| # | PSC Pos. (cx2) | Search Energy (dB) | Antenna Index | # | PSC Pos. (cx2) | Search Energy (dB) | Antenna Index |
| 0 | 6 | −5.48 | 0 | 0 | 6 | −5.48 | 0 |
| 1 | 4 | −14.88 | 0 | 1 | 2 | −12.00 | 1 |
| 2 | 8 | −15.41 | 0 | 2 | 4 | −14.88 | 0 |
| 3 | 0 | −16.20 | 0 | 3 | 11 | −15.26 | 1 |
| 4 | 11 | −15.26 | 1 | 4 | 8 | −15.41 | 0 |
| 5 | 2 | −12.00 | 1 | 5 | 0 | −16.20 | 0 |

| (e) | | | |
|---|---|---|---|
| # | PSC Pos. (cx2) | Search Energy (dB) | Antenna Index |
| 0 | 6 | −5.48 | 0 |
| 1 | 2 | −12.00 | 1 |
| 2 | 4 | −14.88 | 0 |

Figure 5:
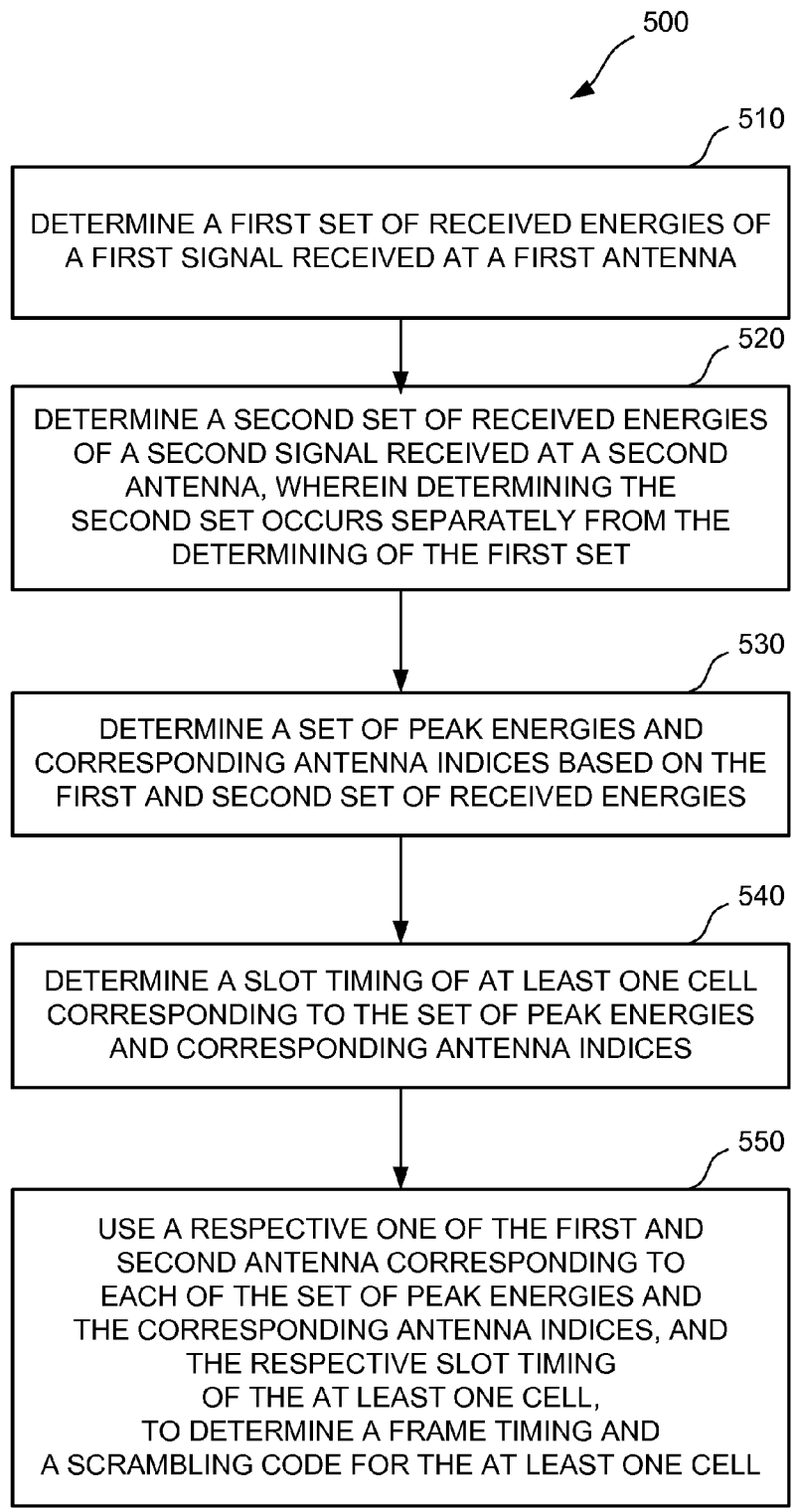
FIG. 5 is a block diagram illustrating an example of a hardware implementation for an apparatus employing a processing system including the searcher component described herein.

Referring to FIG. 5, in one aspect, a method 500 of performing a full cell search by a user equipment in a wireless communication system may be performed by various components of UE 12 of FIG. 1. More particularly, the method 500 may be performed by RxD separate step 1 (or step A) component 16, RxD selective step 2/3 (or step B) component 48, as well as the various sub-components thereof.

At 510, the method 500 includes determining a first set of received energies of a first signal received at a first antenna. For example, energy determiner 18 may be configured to determine a first set of energies 20 of a first signal 28 received at a first antenna 22 (e.g., Rx0).

At 520, the method 500 includes determining a second set of received energies of a second signal received at a second antenna, wherein determining the second set occurs separate from the determining of the first set. For example, energy determiner 18 may be configured to determine a second set of energies 24 of a second signal 32 received at a second antenna 26 (e.g., Rx1) separately from determining the first set of energies 20.

At 530, the method 500 includes determining a set of peak energies and corresponding antenna indices based on the first set of received energies and the second set of received energies. For example, peak/index determiner 40 may be configured to determine a set of peak energies and corresponding antenna indices based on the first set of received energies 20 and the second set of received energies 24.

Optionally, and in an aspect (not shown), the method 500 may include combining the first and second sets of energies and then sorting the combined list to identify a given number of strongest peaks, or alternatively separately sorting each set and then combining the sorted sets to identify a given number of strongest peaks. For example, combiner/sorter (or sorter/combiner) 36 may be configured to combine the first set of energies 20 and the second set of energies 24, then sort the combined set of energies 38, or, alternatively, sort the first set of energies 20 and the second set of energies 24 and then combine the sorted sets (while removing any duplicate peaks). In either case, combiner/sorter (or sorter/combiner) 36 may be configured to determine a combined/sorted (or sorted/combined) set of energies 38 which may be provided to peak/index determiner 40.

At 540, the method 500 includes determining a slot timing of at least one cell corresponding to the set of peak energies and corresponding antenna indices. For example, peak/index determiner 40 may be configured to determine slot timing 46 of at least one cell corresponding to the set of peak energies and corresponding antenna indices determined by peak/index determiner 40.

In other words, referring to actions 510, 520, 530, and 540, in a RxD separate step 1 (or step A) type of search, searcher component 14 executes processing by RxD separate step 1 (or step A) component 16 of the present apparatus and methods to separately determine received energies for each antenna, for example, the P-SCH Ec/Io, to determine slot timing of at least one cell.

At 550, the method 500 includes using a respective one of the first antenna and the second antenna corresponding to each of the set of peak energies and the corresponding antenna indices, and the respective slot timing of the at least one cell, to determine a frame timing and a scrambling code for the at least one cell. For example, RxD selective step 2/3 (or step B) component 48 may be configured to receive the peak positions and corresponding antenna indices from RxD separate step 1 (or step A) component 16. Specific peak/antenna determiner 50 may be configured to use the respective one of the first antenna 22 and the second antenna 26 corresponding to the set of peak energies and corresponding antenna indices, along with the respective slot timing 46 of the at least one cell, to determine a frame timing 52 and scrambling code 54 for the at least one cell. In other words, referring to action 550, in one aspect such as an RxD selective Step 2/3 type of search, searcher component 14 executes processing by RxD selective step 2/3 (or step B) component 48 of the present apparatus and methods to use the best antenna corresponding to a given peak to obtain the secondary synchronization code of the SCH and to determine frame timing and a code group of the at least one cell found as a result of the RxD separate step 1 (or step A) search. Further, RxD selective Step 2/3 component 48 may be configured to perform a chip-by-chip correlation over the CPICH with all codes within the code group identified in the step 2/3 (or step B) to identify a primary scrambling code. After the primary scrambling code has been identified, RxD selective step 2/3 (or step B) component 48 may be configured to detect the Primary CCPCH, and, as such, read the system- and cell-specific BCH information therefrom.

Alternatively, referring to action 550, in another aspect such as a Step B type of search, RxD selective Step 2/3 (or Step B) component 48 may be configured to not use the P-SCH, but, instead, use the CPICH because the UE may have determined that the PSCs of the base stations may be limited to a certain reduced set. In other words, as noted above, RxD selective Step 2/3 (or Step B) component 48 may be configured to use the best antenna corresponding to a given peak to correlate the received signal with a limited number of hypotheses (e.g., 15N as described above) for each identified multipath.

Thus, the present apparatus and methods include an RxD full search enhancement algorithm, including RxD separate step 1 (or step A) search and RxD selective step 2/3 (or step B) search. This new algorithm improves the full search detection probability in presence of Rx imbalance and allows the UE to trade off full searcher performance and computational complexity.

Figure 6:
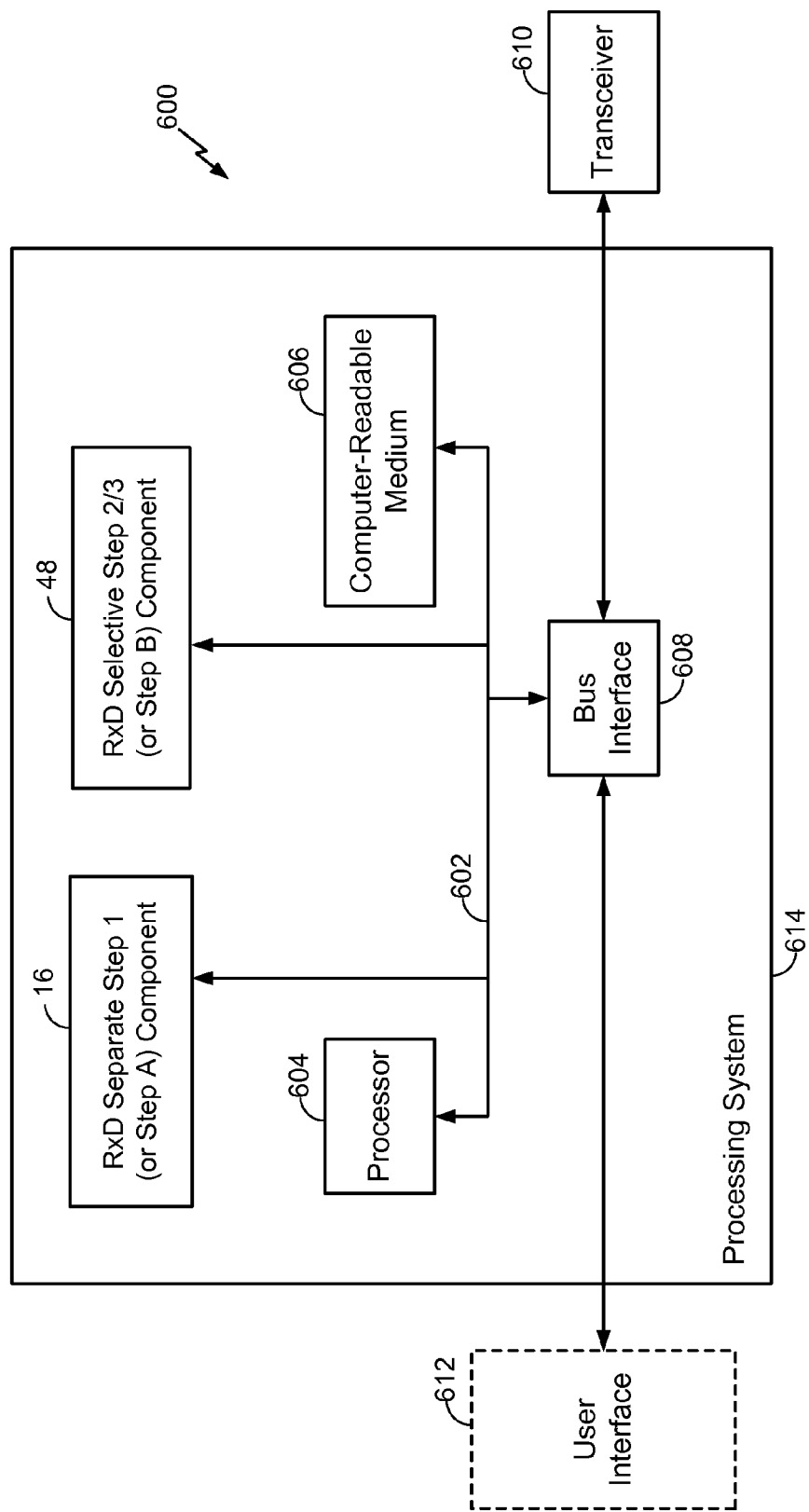
FIG. 6 is a block diagram illustrating an example of a telecommunications system including a UE having the searcher component described herein.

FIG. 6 is a block diagram illustrating an example of a hardware implementation for an apparatus 600 employing a processing system 614, wherein apparatus 600 may be UE 12 of FIG. 1. In this example, the processing system 614 may be implemented with a bus architecture, represented generally by the bus 602. The bus 602 may include any number of interconnecting buses and bridges depending on the specific application of the processing system 614 and the overall design constraints. The bus 602 links together various circuits including one or more processors, represented generally by the processor 604, and computer-readable media, represented generally by the computer-readable medium 606. The bus 602 also may link RxD separate step 1 (or step A) component 16 and RxD selective step 2/3 (or step B) component 48 to one another and to processor 604 and computer-readable medium 606.

The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a means for communicating with various other apparatus over a transmission medium. Depending upon the nature of the apparatus, a user interface 612 (e.g., keypad, display, speaker, microphone, joystick) may also be provided.

The processor 604 is responsible for managing the bus 602 and general processing, including the execution of software stored on the computer-readable medium 606. The software, when executed by the processor 604, causes the processing system 614 to perform the various functions described herein for any particular apparatus including, for example, the functions described with respect to RxD separate step 1 (or step A) component 16 and/or RxD selective step 2/3 (or step B) component 48 and/or any of their respective sub-components. The computer-readable medium 606 may also be used for storing data that is manipulated by the processor 604 when executing software.

The various concepts presented throughout this disclosure may be implemented across a broad variety of telecommunication systems, network architectures, and communication standards.

Figure 7:
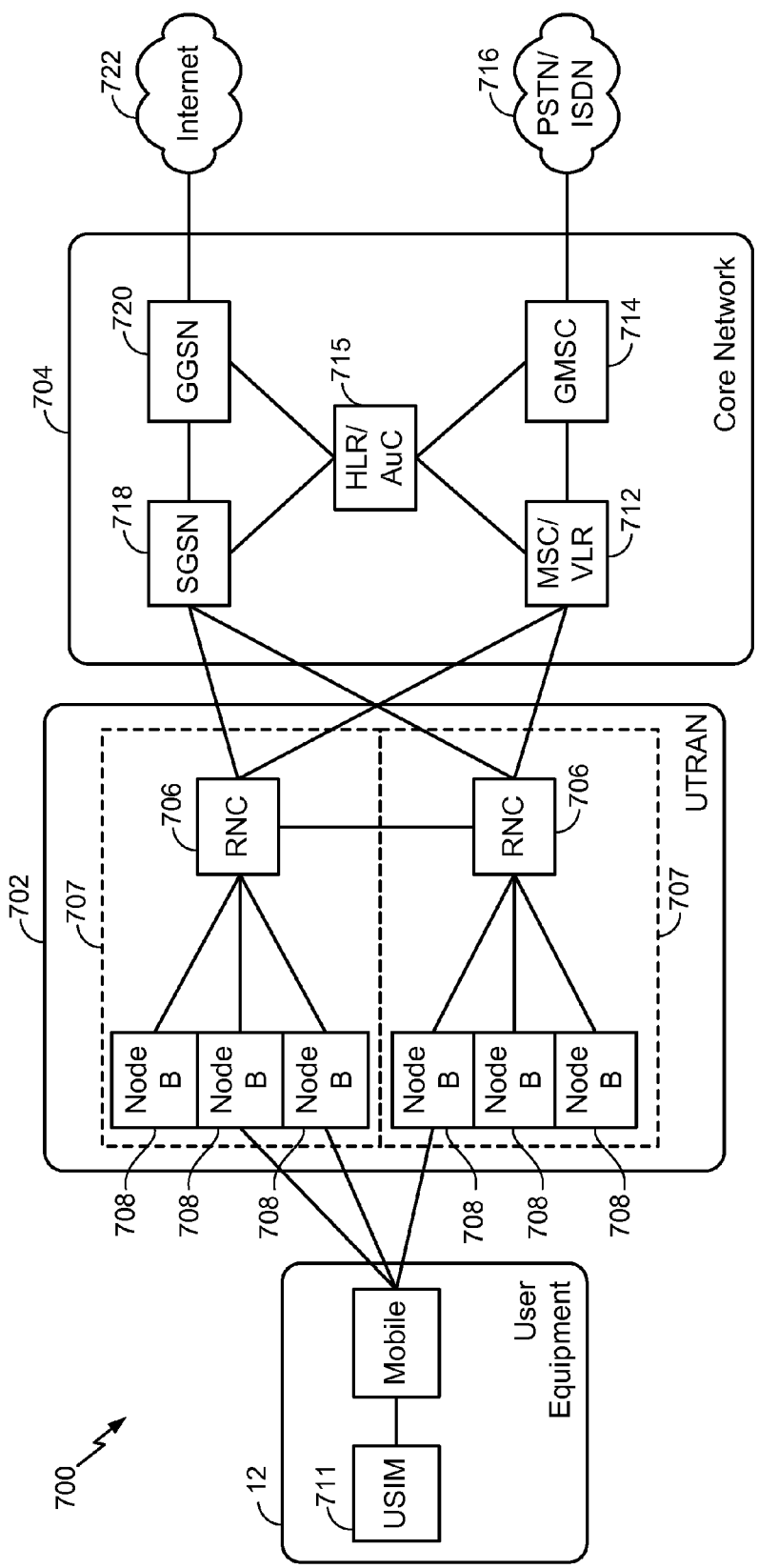
FIG. 7 is a block diagram illustrating an example of an access network including a UE having the searcher component described herein.

Referring to FIG. 7, by way of example and without limitation, the aspects of the present disclosure are presented with reference to a UMTS system 700 employing a W-CDMA air interface. A UMTS network includes three interacting domains: a Core Network (CN) 704, a UMTS Terrestrial Radio Access Network (UTRAN) 702, and User Equipment (UE) 710. For example, UE 710 may be the same as or similar to UE 12 (FIG. 1), e.g., including searcher component 14 as described herein. In this example, the UTRAN 702 provides various wireless services including telephony, video, data, messaging, broadcasts, and/or other services. The UTRAN 702 may include a plurality of Radio Network Subsystems (RNSs) such as an RNS 707, each controlled by a respective Radio Network Controller (RNC) such as an RNC 706. Here, the UTRAN 702 may include any number of RNCs 706 and RNSs 707 in addition to the RNCs 706 and RNSs 707 illustrated herein. The RNC 706 is an apparatus responsible for, among other things, assigning, reconfiguring and releasing radio resources within the RNS 707. The RNC 706 may be interconnected to other RNCs (not shown) in the UTRAN 702 through various types of interfaces such as a direct physical connection, a virtual network, or the like, using any suitable transport network.

Communication between a UE 710 and a Node B 708, which may be the same as or similar to base station$_1$ 30 and/or base station$_2$ 34 of FIG. 1, may be considered as including a physical (PHY) layer and a medium access control (MAC) layer. Further, communication between a UE 710 and an RNC 706 by way of a respective Node B 708 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 707 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 708 are shown in each RNS 707; however, the RNSs 707 may include any number of wireless Node Bs. The Node Bs 708 provide wireless access points to a CN 704 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 710 may further include a universal subscriber identity module (USIM) 711, which contains a user's subscription information to a network. For illustrative purposes, one UE 710 is shown in communication with a number of the Node Bs 708. The DL, also called the forward link, refers to the communication link from a Node B 708 to a UE 710, and the UL, also called the reverse link, refers to the communication link from a UE 710 to a Node B 708.

The CN 704 interfaces with one or more access networks, such as the UTRAN 702. As shown, the CN 704 is a GSM core network. However, as those skilled in the art will recognize, the various concepts presented throughout this disclosure may be implemented in a RAN, or other suitable access network, to provide UEs with access to types of CNs other than GSM networks.

The CN 704 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 704 supports circuit-switched services with a MSC 712 and a GMSC 714. In some applications, the GMSC 714 may be referred to as a media gateway (MGW). One or more RNCs, such as the RNC 706, may be connected to the MSC 712. The MSC 712 is an apparatus that controls call setup, call routing, and UE mobility functions. The MSC 712 also includes a VLR that contains subscriber-related information for the duration that a UE is in the coverage area of the MSC 712. The GMSC 714 provides a gateway through the MSC 712 for the UE to access a circuit-switched network 716. The GMSC 714 includes a home location register (HLR) 715 containing subscriber data, such as the data reflecting the details of the services to which a particular user has subscribed. The HLR is also associated with an authentication center (AuC) that contains subscriber-specific authentication data. When a call is received for a particular UE, the GMSC 714 queries the HLR 715 to determine the UE's location and forwards the call to the particular MSC serving that location.

The CN 704 also supports packet-data services with a serving GPRS support node (SGSN) 718 and a gateway GPRS support node (GGSN) 720. GPRS, which stands for General Packet Radio Service, is designed to provide packet-data services at speeds higher than those available with standard circuit-switched data services. The GGSN 720 provides a connection for the UTRAN 702 to a packet-based network 722. The packet-based network 722 may be the Internet, a private data network, or some other suitable packet-based network. The primary function of the GGSN 720 is to provide the UEs 710 with packet-based network connectivity. Data packets may be transferred between the GGSN 720 and the UEs 710 through the SGSN 718, which performs primarily the same functions in the packet-based domain as the MSC 712 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudo-random bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 708 and a UE 710. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 710 provides feedback to the Node B 708 over the HS-DPCCH to indicate whether it correctly decoded a packet on the downlink.

HS-DPCCH further includes feedback signaling from the UE 710 to assist the Node B 708 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the Node B 708 and/or the UE 710 may have multiple antennas supporting MIMO technology. The use of MIMO technology enables the Node B 708 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 710 to increase the data rate or to multiple UEs 710 to increase the overall system capacity. This is achieved by spatially precoding each data stream and then transmitting each spatially precoded stream through a different transmit antenna on the downlink. The spatially precoded data streams arrive at the UE(s) 710 with different spatial signatures, which enables each of the UE(s) 710 to recover the one or more the data streams destined for that UE 710. On the uplink, each UE 710 may transmit one or more spatially precoded data streams, which enables the Node B 708 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 8:
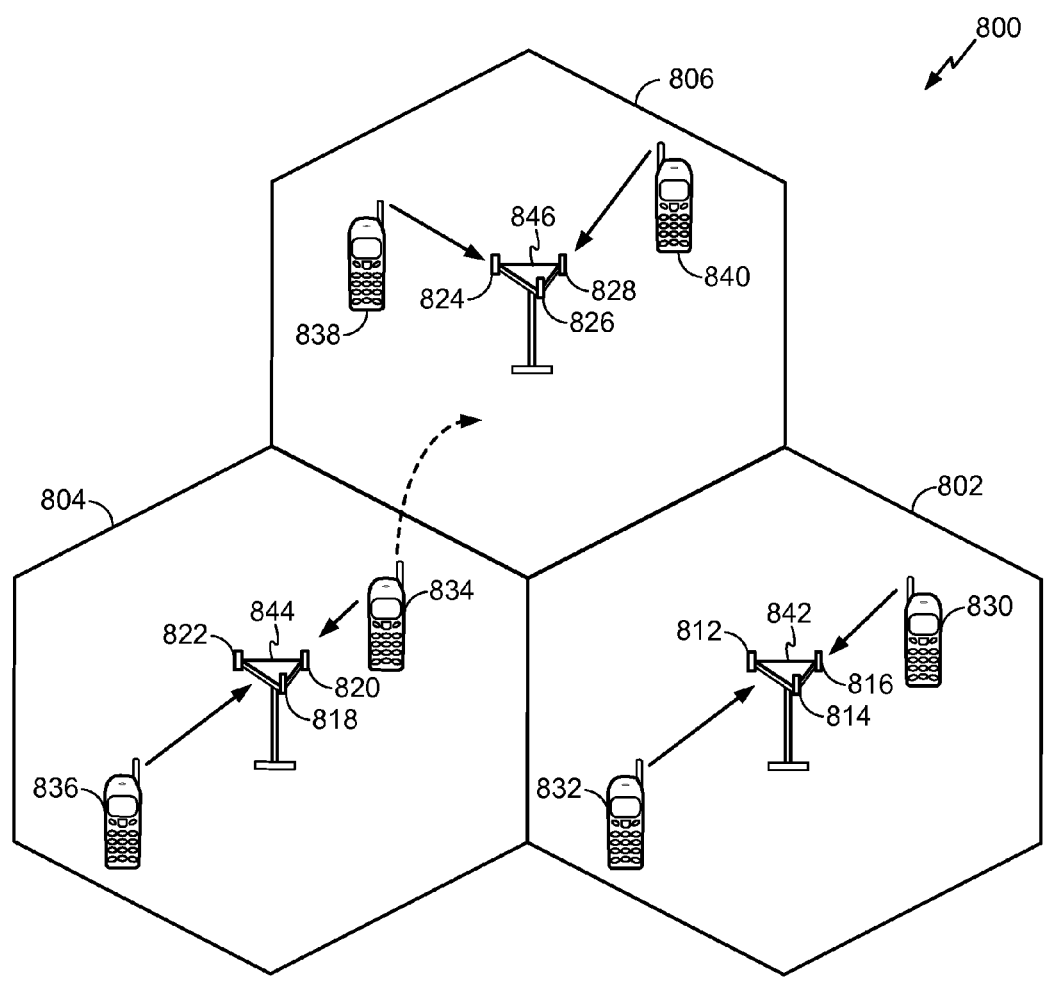
FIG. 8 is a block diagram illustrating an example of a radio protocol architecture for the user and control plane that may be utilized by the UE of FIG. 1.

Referring to FIG. 8, an access network 800 in a UTRAN architecture is illustrated including one or more UEs 830, 832, 834, 836, 838, 840 that may be configured to be the same as or similar to UE 12 (FIG. 1), e.g., including searcher component 14 as described herein. The multiple access wireless communication system includes multiple cellular regions (cells), including cells 802, 804, and 806, each of which may include one or more sectors. The multiple sectors can be formed by groups of antennas with each antenna responsible for communication with UEs in a portion of the cell. For example, in cell 802, antenna groups 812, 814, and 816 may each correspond to a different sector. In cell 804, antenna groups 818, 820, and 822 each correspond to a different sector. In cell 806, antenna groups 824, 826, and 828 each correspond to a different sector. The cells 802, 804 and 806 may include several wireless communication devices, e.g., UEs, which may be in communication with one or more sectors of each cell 802, 804 or 806. For example, UEs 830 and 832 may be in communication with Node B 842, UEs 834 and 836 may be in communication with Node B 844, and UEs 838 and 840 can be in communication with Node B 846. Here, each Node Bs 842, 844, 846, which may be the same as, or similar to, base station$_1$ 30 and/or base station$_2$ 34 of FIG. 1, are configured to provide an access point to a CN 704 (see FIG. 7) for all the UEs 830, 832, 834, 836, 838, 840 in the respective cells 802, 804, and 806.

As the UE 834 moves from the illustrated location in cell 804 into cell 806, a serving cell change (SCC) or handover may occur in which communication with the UE 834 transitions from the cell 804, which may be referred to as the source cell, to cell 806, which may be referred to as the target cell. Management of the handover procedure may take place at the UE 834, at the Node Bs corresponding to the respective cells, at a radio network controller 706 (see FIG. 7), or at another suitable node in the wireless network. For example, during a call with the source cell 804, or at any other time, the UE 834 may monitor various parameters of the source cell 804 as well as various parameters of neighboring cells such as cells 806 and 802. Further, depending on the quality of these parameters, the UE 834 may maintain communication with one or more of the neighboring cells. During this time, the UE 834 may maintain an Active Set, that is, a list of cells that the UE 834 is simultaneously connected to (i.e., the UTRA cells that are currently assigning a downlink dedicated physical channel DPCH or fractional downlink dedicated physical channel F-DPCH to the UE 834 may constitute the Active Set).

The modulation and multiple access scheme employed by the access network 800 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The radio protocol architecture may take on various forms depending on the particular application. An example for an HSPA system will now be presented with reference to FIG. 9.

Figure 9:
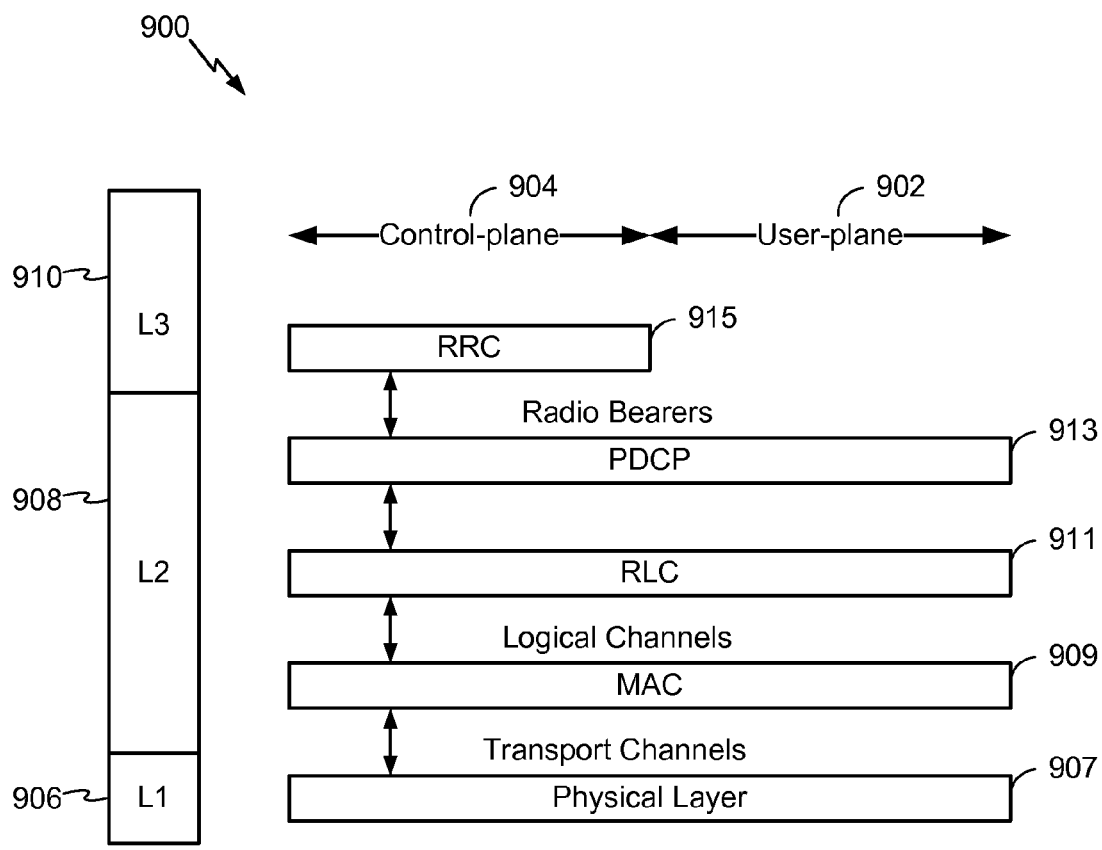
FIG. 9 is a block diagram conceptually illustrating an example of a Node B in communication with a UE in a telecommunications system, where the UE may be the same as or similar to the UE of FIG. 1.

Referring to FIG. 9, an example radio protocol architecture 900 relates to the user plane 902 and the control plane 904 of a user equipment (UE) or Node B/base station. For example, architecture 900 may be included in a UE such as UE 12 (FIG. 1), including searcher component 14 and/or in a base station such as base station₁ 30 and/or base station 34 of FIG. 1. The radio protocol architecture 900 for the UE and Node B is shown with three layers: Layer 1 906, Layer 2 908, and Layer 3 910. Layer 1 906 is the lowest lower and implements various physical layer signal processing functions. As such, Layer 1 906 includes the physical layer 907. Layer 2 (L2 layer) 908 is above the physical layer 907 and is responsible for the link between the UE and Node B over the physical layer 907. Layer 3 (L3 layer) 910 includes a radio resource control (RRC) sublayer 915. The RRC sublayer 915 handles the control plane signaling of Layer 3 between the UE and the UTRAN.

In the user plane, the L2 layer 908 includes a media access control (MAC) sublayer 909, a radio link control (RLC) sublayer 911, and a packet data convergence protocol (PDCP) 913 sublayer, which are terminated at the Node B on the network side. Although not shown, the UE may have several upper layers above the L2 layer 908 including a network layer (e.g., IP layer) that is terminated at a PDN gateway on the network side, and an application layer that is terminated at the other end of the connection (e.g., far end UE, server, etc.).

The PDCP sublayer 913 provides multiplexing between different radio bearers and logical channels. The PDCP sublayer 913 also provides header compression for upper layer data packets to reduce radio transmission overhead, security by ciphering the data packets, and handover support for UEs between Node Bs. The RLC sublayer 911 provides segmentation and reassembly of upper layer data packets, retransmission of lost data packets, and reordering of data packets to compensate for out-of-order reception due to hybrid automatic repeat request (HARQ). The MAC sublayer 909 provides multiplexing between logical and transport channels. The MAC sublayer 909 is also responsible for allocating the various radio resources (e.g., resource blocks) in one cell among the UEs. The MAC sublayer 909 is also responsible for HARQ operations.

Figure 10:
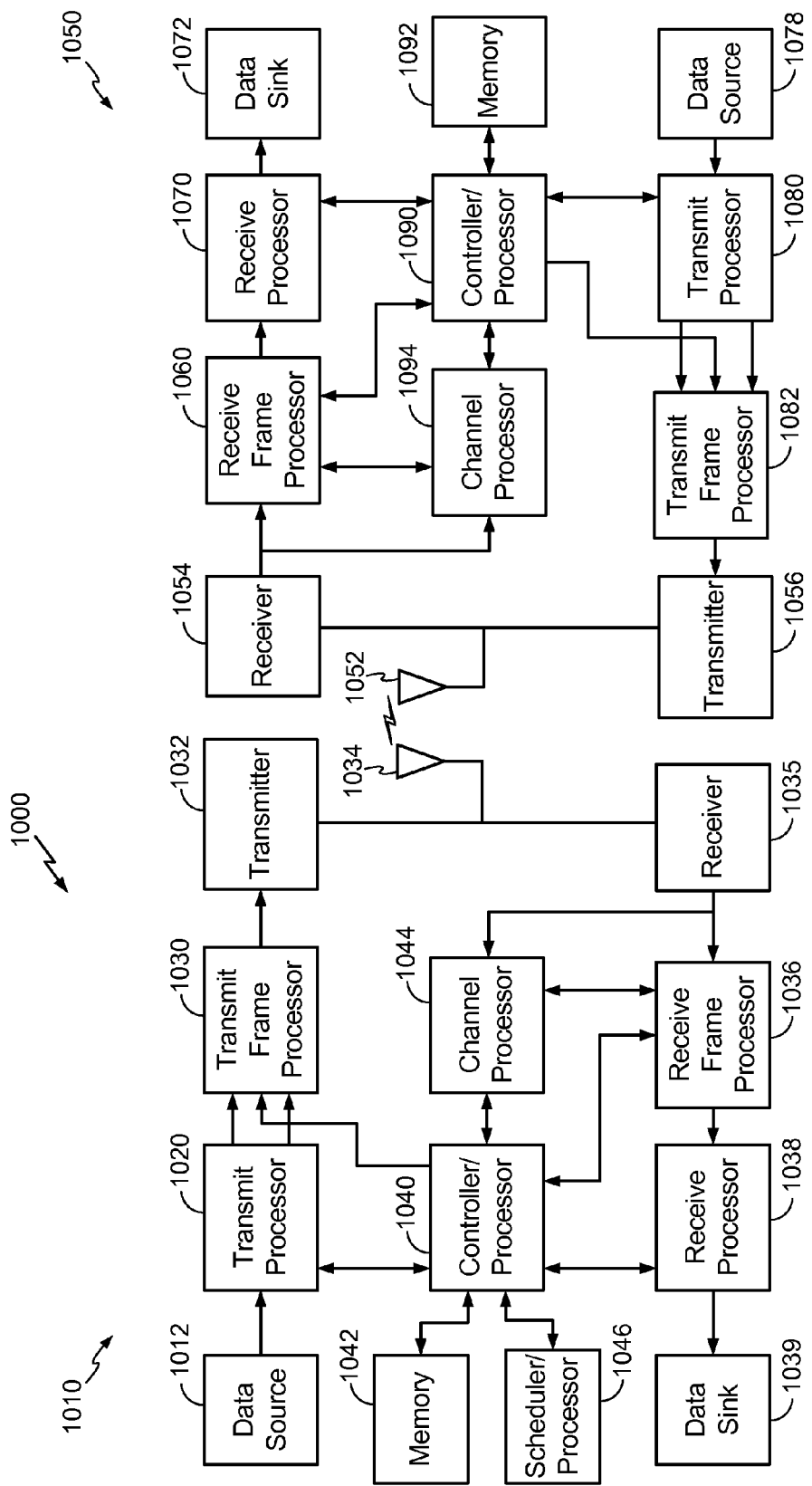
FIG. 10 is an aspect of a Node B 510 in communication with a UE 1050 is illustrated, where the Node B 1010 may be the Node B 708 in FIG. 7, base station₁ 30, and/or base station₂ 34 in FIG. 1, and the UE 1050 may be the same as or similar to UE 12 in FIG. 1, including searcher component 14 as described herein and implemented with a processor or memory.

Referring to FIG. 10, an aspect of a Node B 510 in communication with a UE 1050 is illustrated, where the Node B 1010 may be the Node B 708 in FIG. 7, base station₁ 30, and/or base station₂ 34 in FIG. 1, and the UE 1050 may be the same as or similar to UE 12 in FIG. 1, including searcher component 14 as described herein and implemented with a processor or memory. In the downlink communication, a transmit processor 1020 may receive data from a data source 1012 and control signals from a controller/processor 1040. The transmit processor 1020 provides various signal processing functions for the data and control signals, as well as reference signals (e.g., pilot signals). For example, the transmit processor 1020 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 1044 may be used by a controller/processor 1040 to determine the coding, modulation, spreading, and/or scrambling schemes for the transmit processor 1020. These channel estimates may be derived from a reference signal transmitted by the UE 1050 or from feedback from the UE 1050. The symbols generated by the transmit processor 1020 are provided to a transmit frame processor 1030 to create a frame structure. The transmit frame processor 1030 creates this frame structure by multiplexing the symbols with information from the controller/processor 1040, resulting in a series of frames. The frames are then provided to a transmitter 1032, which provides various signal conditioning functions including amplifying, filtering, and modulating the frames onto a carrier for downlink transmission over the wireless medium through antenna 1034. The antenna 1034 may include one or more antennas, for example, including beam steering bidirectional adaptive antenna arrays or other similar beam technologies.

At the UE 1050, a receiver 1054 receives the downlink transmission through an antenna 1052 and processes the transmission to recover the information modulated onto the carrier. The information recovered by the receiver 1054 is provided to a receive frame processor 1060, which parses each frame, and provides information from the frames to a channel processor 1094 and the data, control, and reference signals to a receive processor 1070. The receive processor 1070 then performs the inverse of the processing performed by the transmit processor 1020 in the Node B 1010. More specifically, the receive processor 1070 descrambles and despreads the symbols, and then determines the most likely signal constellation points transmitted by the Node B 1010 based on the modulation scheme. These soft decisions may be based on channel estimates computed by the channel processor 1094. The soft decisions are then decoded and deinterleaved to recover the data, control, and reference signals. The CRC codes are then checked to determine whether the frames were successfully decoded. The data carried by the successfully decoded frames will then be provided to a data sink 1072, which represents applications running in the UE 1050 and/or various user interfaces (e.g., display). Control signals carried by successfully decoded frames will be provided to a controller/processor 1090. When frames are unsuccessfully decoded by the receiver processor 1070, the controller/processor 1090 may also use an acknowledgement (ACK) and/or negative acknowledgement (NACK) protocol to support retransmission requests for those frames.

In the uplink, data from a data source 1078 and control signals from the controller/processor 1090 are provided to a transmit processor 1080. The data source 1078 may represent applications running in the UE 1050 and various user interfaces (e.g., keyboard). Similar to the functionality described in connection with the downlink transmission by the Node B 1010, the transmit processor 1080 provides various signal processing functions including CRC codes, coding and interleaving to facilitate FEC, mapping to signal constellations, spreading with OVSFs, and scrambling to produce a series of symbols. Channel estimates, derived by the channel processor 1094 from a reference signal transmitted by the Node B 1010 or from feedback contained in the midamble transmitted by the Node B 1010, may be used to select the appropriate coding, modulation, spreading, and/or scrambling schemes. The symbols produced by the transmit processor 1080 will be provided to a transmit frame processor 1082 to create a frame structure. The transmit frame processor 1082 creates this frame structure by multiplexing the symbols with information from the controller/processor 1090, resulting in a series of frames. The frames are then provided to a transmitter 1056, which provides various signal conditioning functions including amplification, filtering, and modulating the frames onto a carrier for uplink transmission over the wireless medium through the antenna 1052.

The uplink transmission is processed at the Node B 1010 in a manner similar to that described in connection with the receiver function at the UE 1050. A receiver 1035 receives the uplink transmission through the antenna 1034 and processes the transmission to recover the information modulated onto the carrier. The information recovered by the receiver 1035 is provided to a receive frame processor 1036, which parses each frame, and provides information from the frames to the channel processor 1044 and the data, control, and reference signals to a receive processor 1038. The receive processor 1038 performs the inverse of the processing performed by the transmit processor 1080 in the UE 1050. The data and control signals carried by the successfully decoded frames may then be provided to a data sink 1039 and the controller/processor, respectively. If some of the frames were unsuccessfully decoded by the receive processor, the controller/processor 1040 may also use an acknowledgement (ACK) and/or negative acknowledgement (NACK) protocol to support retransmission requests for those frames.

The controller/processors 1040 and 1090 may be used to direct the operation at the Node B 1010 and the UE 1050, respectively. For example, the controller/processors 1040 and 1090 may provide various functions including timing, peripheral interfaces, voltage regulation, power management, and other control functions. The computer readable media of memories 1042 and 1092 may store data and software for the Node B 1010 and the UE 1050, respectively. A scheduler/processor 1046 at the Node B 1010 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of performing a full cell search by a user equipment in a wireless communication system, comprising:

determining a first set of received energies of a first signal received at a first antenna;

determining a second set of received energies of a second signal received at a second antenna, wherein determining the second set occurs separately from the determining of the first set;

selecting a set of peak energies and corresponding antenna indices from the first set of received energies and the second set of received energies, the antenna indices indicating a selected antenna of the first antenna and the second antenna corresponding to each peak, wherein selecting the set of peak energies and corresponding antenna indices comprises:

combining the first set with the second set to define a combined set including a first received energy of the first signal received at the first antenna and a second received energy of the second signal received at the second antenna, for each of a plurality of positions;

determining a set of top peak energies having highest peak energy values from the combined set; and determining the corresponding antenna index and the position corresponding to each of the set of top peak energies;

determining a slot timing of at least one cell corresponding to the set of peak energies and corresponding antenna indices based on the positions of the set of top peak energies and the corresponding antenna indices; and using a respective one of the first antenna and the second antenna corresponding to each of the set of peak energies and the corresponding antenna indices, and the respective slot timing of the at least one cell, to determine a frame timing and a scrambling code for the at least one cell.

2. The method of claim 1, further comprising sorting the combined set based on a value of each of the respective peak energies.

3. The method of claim 1, wherein selecting the set of peak energies and corresponding antenna indices further comprises:

discarding duplicate peaks between the first set and the second set, wherein the duplicate peaks have a same position as a peak energy of the selected antenna.

4. The method of claim 3, further comprising:

sorting the first set of received energies based on a value of each of the respective peak energies;

sorting the second set of received energies based on a value of each of the respective peak energies;

wherein the determining of the set of top peak energies is based on the sorted first set and the sorted second set.

5. The method of claim 1, wherein:

the first signal and the second signal comprise a primary synchronization channel (P-SCH) signal, the first set of received energies and the second set of received energies respectively comprise a ratio of P-SCH pilot signal power (Ec) to total power (Io) (Ec/Io) energies, and selecting the set of peak energies and corresponding antenna indices includes selecting the respective one of the first antenna and the second antenna having a higher P-SCH Ec/Io energy as identified by comparing the separately determined first set of received energies and the second set of received energies as the selected antenna corresponding to each peak.

6. The method of claim 5, wherein using the respective one of the first antenna and the second antenna to determine the frame timing and the scrambling code for the at least one cell further comprises using a second synchronization channel (S-SCH).

7. The method of claim 5, wherein using the respective one of the first antenna and the second antenna to determine the frame timing and the scrambling code for the at least one cell further comprises using a common pilot channel (CPICH) and correlating to a limited number of scrambling code hypotheses.

8. The method of claim 1, further including determining whether an antenna imbalance, an efficiency gain, or an resource availability meets a threshold prior to performing the separate determining of the first and second set of received energies and selectively using a respective one of the first antenna and the second antenna.

9. A non-transitory computer-readable medium storing computer executable code for performing a full search by a user equipment in a wireless communication system, -comprising:

code for determining a first set of received energies of a first signal received at a first antenna;

code for determining a second set of received energies of a second signal received at a second antenna, wherein determining the second set occurs separate from the determining of the first set;

code for selecting a set of peak energies and corresponding antenna indices from the first set of received energies and the second set of received energies, the antenna indices indicating a selected antenna of the first antenna and the second antenna corresponding to each peak, wherein the code for selecting the set of peak energies and corresponding antenna indices comprises:

code for combining the first set with the second set to define a combined set including a first received energy of the first signal received at the first antenna and a second received energy of the second signal received at the second antenna, for each of a plurality of positions;

code for determining a set of top peak energies having highest peak energy values from the combined set; and code for determining the corresponding antenna index and the position corresponding to each of the set of top peak energies;

code for determining a slot timing of at least one cell corresponding to the set of peak energies and corresponding antenna indices based on the positions of the set of top peak energies and the corresponding antenna indices; and code for using a respective one of the first antenna and the second antenna corresponding to each of the set of peak energies and the corresponding antenna indices, and the respective slot timing of the at least one cell, to determine a frame timing and a scrambling code for the at least one cell.

10. An apparatus for performing a full cell search by a user equipment in a wireless communication system, comprising:

means for determining a first set of received energies of a first signal received at a first antenna;

means for determining a second set of received energies of a second signal received at a second antenna, wherein determining the second set occurs separate from the determining of the first set;

means for selecting a set of peak energies and corresponding antenna indices from the first set of received energies and the second set of received energies, the antenna indices indicating a selected antenna of the first antenna and the second antenna corresponding to each peak, wherein the means for selecting are configured to;
  combine the first set with the second set to define a combined set including a first received energy of the first signal received at the first antenna and a second received energy of the second signal received at the second antenna, for each of a plurality of positions;
  determine a set of top peak energies having highest peak energy values from the combined set; and
  determine the corresponding antenna index and the position corresponding to each of the set of top peak energies;
means for determining a slot timing of at least one cell corresponding to the set of peak energies and corresponding antenna indices based on the positions of the set of top peak energies and the corresponding antenna indices; and
means for using a respective one of the first antenna and the second antenna corresponding to each of the set of peak energies and the corresponding antenna indices, and the respective slot timing of the at least one cell, to determine a frame timing and a scrambling code for the at least one cell.

11. An apparatus for performing a full cell search by a user equipment in a wireless communication system, comprising:
  a first antenna configured to receive a first signal;
  a second antenna configured to receive a second signal;
  at least one memory; and
  a processor in communication with the memory, the processor and the memory configured to:
  determine a first set of received energies of the first signal received at the first antenna;
  determine a second set of received energies of the second signal received at the second antenna, wherein determining the second set occurs separate from the determining of the first set;
  select a set of peak energies and corresponding antenna indices from the first set of received energies and the second set of received energies, the antenna indices indicating a selected antenna of the first antenna and the second antenna corresponding to each peak, wherein the processor is configured to:
    combine the first set with the second set to define a combined set including a first received energy of the first signal received at the first antenna and a second received energy of the second signal received at the second antenna, for each of a plurality of positions,
    determine a set of top peak energies having highest peak energy values from the combined set, and
    determine the corresponding antenna index and the position corresponding to each of the set of top peak energies;
  determine a slot timing of at least one cell corresponding to the set of peak energies and corresponding antenna indices based on the positions of the set of top peak energies and the corresponding antenna indices; and
  use a respective one of the first antenna and the second antenna corresponding to each of the set of peak energies and the corresponding antenna indices, and the respective slot timing of the at least one cell, to determine a frame timing and a scrambling code for the at least one cell.

12. The apparatus of claim 11, wherein the processor and the memory are configured to sort the combined set based on a value of each of the respective peak energies.

13. The apparatus of claim 11, wherein the processor and the memory are configured to:
  discard duplicate peaks between the first set and the second set, wherein the duplicate peaks have a same position as a peak energy of the other antenna.

14. The apparatus of claim 13,
  wherein the processor and the memory are configured to:
    sort the first set of received energies based on a value of each of the respective peak energies,
    sort the second set of received energies based on a value of each of the respective peak energies, and
    select the set of top peak energies from sorted first set and the sorted second set.

15. The apparatus of claim 11, wherein:
  the first signal and the second signal comprise a primary synchronization channel (P-SCH) signal;
  the first set of received energies and the second set of received energies respectively comprise a ratio of P-SCH pilot signal power (Ec) to total power (Io) (Ec/Io) energies; and
  the processor and the memory are configured to select the respective one of the first antenna and the second antenna having a higher P-SCH Ec/Io energy as identified by comparing the separately determined first set of received energies and the second set of received energies as the selected antenna corresponding to each peak.

16. The apparatus of claim 15, the processor and the memory are configured to use a secondary synchronization channel S-SCH received at the selected antenna to determine the frame timing and the scrambling code for the at least one cell.

17. The apparatus of claim 15, wherein the processor and the memory are configured to correlate a common pilot channel CPICH received on the selected antenna to a limited number of scrambling code hypotheses based on the set of peak energies and the respective slot timing of the at least one cell to determine a frame timing and a scrambling code for the at least one cell.

18. The apparatus of claim 11, wherein the processor and the memory are configured to determine whether an antenna imbalance, an efficiency gain, or a resource availability meets a threshold prior to the separate determining of the first and second set of received energies and to selectively use a respective one of the first antenna and the second antenna.

* * * * *